United States Patent
Malisz et al.

(10) Patent No.: US 6,860,906 B2
(45) Date of Patent: Mar. 1, 2005

(54) PROCESS FOR PREPARING SOLUTIONS OF ANIONIC ORGANIC COMPOUNDS

(75) Inventors: Jacek Malisz, Grenzach-Wyhlen (DE); Adolf Käser, Bottmingen (CH); Rainer Kaufel, Hartheim (DE); Holger Lautenbach, Grenzach-Wyhlen (DE); Elke Polley, Grenzach-Wyhlen (DE); Martina Hoffmann, Hausen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 123 days.

(21) Appl. No.: 10/296,108

(22) PCT Filed: May 21, 2001

(86) PCT No.: PCT/EP01/05796
§ 371 (c)(1),
(2), (4) Date: Nov. 22, 2002

(87) PCT Pub. No.: WO01/90257
PCT Pub. Date: Nov. 29, 2001

(65) Prior Publication Data
US 2003/0164475 A1 Sep. 4, 2003

(30) Foreign Application Priority Data
May 26, 2000  (EP) ............................................ 00810462

(51) Int. Cl.$^7$ .......................... B01D 61/16; C09B 67/46; D21H 17/03
(52) U.S. Cl. ....................... 8/648; 8/527; 8/673; 8/680; 8/919; 210/639; 210/651; 210/710; 162/162
(58) Field of Search ................. 8/527, 673, 680, 8/648; 210/639, 651, 710; 162/162

(56) References Cited

U.S. PATENT DOCUMENTS

| | | | |
|---|---|---|---|
| 4,402,701 A | 9/1983 | Gleinig et al. ................. | 8/436 |
| 4,689,048 A | 8/1987 | Förtsch et al. ................. | 8/524 |
| 4,778,603 A | 10/1988 | Koll et al. .................... | 210/650 |
| 4,851,011 A | 7/1989 | Lacroix et al. ................ | 8/527 |
| 4,865,744 A | 9/1989 | Härtling et al. .............. | 210/651 |
| 5,565,102 A | 10/1996 | Brandt et al. .......... | 210/500.28 |
| 6,120,561 A | 9/2000 | Wild et al. ...................... | 8/527 |
| 6,241,786 B1 * | 6/2001 | Zarges et al. .................. | 8/527 |
| 6,719,906 B1 * | 4/2004 | Malisz et al. ................ | 210/639 |

FOREIGN PATENT DOCUMENTS

| | | |
|---|---|---|
| DE | 4108596 | 9/1991 |
| DE | 4116522 | 11/1991 |
| EP | 0049802 | 4/1982 |
| EP | 0197006 | 10/1986 |
| EP | 0278320 | 8/1988 |
| EP | 0287515 | 10/1988 |
| EP | 0302015 | 2/1989 |
| EP | 0505870 | 9/1992 |
| EP | 0652044 | 5/1995 |
| EP | 0802240 | 10/1997 |
| EP | 0992547 | 4/2000 |
| WO | 01/32786 | 5/2001 |

OTHER PUBLICATIONS

Derwent Abstr. 91–289209/40 for DE 4108596 (1991).
Derwent Abstr. 91–355302/49 for DE 4116522 (1991).
Derwent Abstr. 92–325191/40 for EP 505870 (1992).

* cited by examiner

Primary Examiner—Margaret Einsmann
(74) Attorney, Agent, or Firm—Tyler A. Stevenson

(57) ABSTRACT

Described is a process for preparing concentrated solutions or suspensions of anionic organic compounds which comprises a) acidifying an aqueous solution or suspension of an anionic organic compound containing salts and/or impurities to a pH of 4.5 or less, if the pH is above this value, so that b) the anionic organic compound is water-insoluble and precipitates in the form of the free acid, c) bringing the suspension to a salt content below 2% by weight, based on the total weight of the retentate, by means of ultrafiltration with a membrane having pore diameters of from 0.001 to 0.02 $\mu$m, and d) optionally washing out the salts with water having a pH below 4,5, e) optionally carrying out acid-free washing with water thereafter, and then f) concentrating, so that the amount of anionic organic compound is 5–50% by weight, and g) if desired, bringing the anionic organic compound into solution by adding an appropriate base.

20 Claims, No Drawings

PROCESS FOR PREPARING SOLUTIONS OF ANIONIC ORGANIC COMPOUNDS

The present invention relates to a process for preparing solutions of anionic organic compounds, to the solutions thus prepared and to the use of such solutions. By anionic organic compounds are meant, in particular, dyes and optical brighteners and also intermediates for the preparation thereof.

In recent years, the use of concentrated aqueous solutions, of dyes and optical brighteners, for example, has increased in importance, owing to the advantages which such solutions possess over the corresponding powder forms. Through the use of solutions, the difficulties associated with the formation of dust are avoided and the users are freed from the time-consuming and often difficult dissolving of the powder in water. The use of concentrated solutions has also been promoted by the development of continuous processes for dyeing or optically brightening paper, since with these processes it is judicious to introduce the solution directly into the hollander or to add it at any other suitable point in the papermaking process.

With certain dyes and optical brighteners, however, it is difficult to formulate concentrated solutions, since such solutions, especially if they contain significant amounts of inorganic salts, have a tendency to gel. In that case it is virtually impossible to remove salts from such gels and/or to purify them by filtration and washing.

Furthermore, when the concentrated solutions are stored, especially at temperatures below room temperature, a relatively frequent occurrence is the formation of deposits which can be brought back into solution only with considerable effort, if at all. Furthermore, concentrated solutions of anionic dyes or optical brighteners, which are appropriate as the commercial form, ought to give clear solutions when diluted for the preparation of the dyebaths, these solutions containing from about 1 to 3% of dye or optical brightener, without precipitation, and should do so within a very wide pH range as well.

It was an object of the present invention to provide suitable concentrated solutions of such dyes and optical brighteners, and also intermediates for the preparation thereof, where the abovementioned difficulties do not occur.

It has now been found that, by means of the process described below, it is possible simply and cost-effectively to prepare concentrated solutions which satisfy the abovementioned requirements in an outstanding way. The process constitutes a simple and cost-effective method of converting anionic organic compounds which are in a poorly soluble salt form into a readily soluble form by intermediate conversion of some or all of the acidic groups into the acid form and subsequently carrying out neutralization with appropriate bases.

DE-A-199 27 398 has already described a process for preparing formulations comprising dyes and/or brighteners, in which an aqueous suspension comprising dyes and/or brighteners is desalinated using a microfiltration membrane having pore diameters of from 0.05 to 40 μm. It has now been found that, surprisingly, the desalination is carried out advantageously by ultrafiltration with a membrane having pore diameters of from 0.001 to 0.02 μm. When using such a membrane having markedly smaller pore sizes, it is found contrary to expectation that backwashing is necessary less frequently, thereby raising the capacity of the desalination unit; the performance of the membranes is stable at a high level. In particular, fewer problems occur if the dyes and/or brighteners are present in non-uniform crystal sizes or are reduced in size by the process (very high circulation).

The present invention accordingly provides a process for preparing concentrated solutions or suspensions of anionic organic compounds, which comprises a) acidifying an aqueous solution or suspension of an anionic organic compound containing salts and/or impurities to a pH of 4.5 or less, if the pH is above this value, so that b) the anionic organic compound is water-insoluble and precipitates in the form of the free acid, c) bringing the suspension to a salt content below 2% by weight, based on the total weight of the retentate, by means of ultrafiltration with a membrane having pore diameters of from 0.001 to 0.02 μm, and d) optionally washing out the salts with water having a pH below 4.5, e) optionally carrying out acid-free washing with water thereafter, and then f) concentrating, so that the amount of anionic organic compound is 5–50% by weight, and g) if desired, bringing the anionic organic compound into solution by adding an appropriate base.

By anionic organic compounds are meant, in particular, dyes and optical brighteners and also intermediates for the preparation thereof.

Suitable dyes for the process of the invention include anionic dyes which are stable and insoluble in water at pH levels below 4.5. These dyes may belong to any class. They comprise, for example, dyes containing at least one sulfonic acid and/or carboxylic acid group, from the following dye classes: metal-free or metallic monoazo, disazo and polyazo dyes, pyrazolone, thioxanthone, oxazine, stilbene, formazan, anthraquinone, nitro, methine, triphenylmethane, xanthone, naphthazarine, styryl, azastyryl, naphthoperinone, quinophthalone, and phthalocyanine dyes. These dyes may contain one or more fibre-reactive groups in the molecule.

With preference, the dyes involved are azo dyes containing at least one sulfo group, and among these are preferably those known as azo direct dyes, for example those listed in the Colour Index, Third Edition, Volume 2 (The Society of Dyers and Colourists, 1971). A further preferred class is that known as the stilbene dyes.

Particular preference is given to the dyes suitable for dyeing paper and, of these, more particularly the dyes of the formula

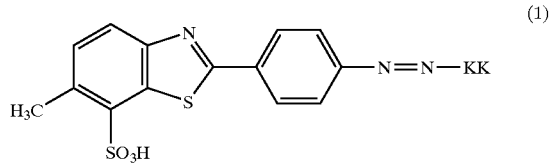

(1)

in which KK denotes the radical of a coupling component.

Preferably, KK is a coupling component of the formula

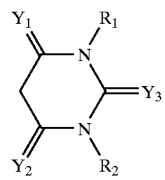
(2)

in which

Y$_1$ and Y$_2$ independently of one another are =O, =NH, or =N—C$_1$-C$_4$alkyl, Y$_3$ is =O, =S, =NR or =N—CN, where R is hydrogen or C$_1$-C$_4$alkyl, and R$_1$ and R$_2$ independently of one another are each hydrogen, unsubstituted or substituted alkyl or unsubstituted or substituted phenyl.

In the above formula (2), only one tautomeric form is indicated with the coupling component; however, this formula is intended to embrace the other tautomeric forms as well.

Unsubstituted or substituted alkyl groups R$_1$ and/or R$_2$ are for example methyl, ethyl, n- or isopropyl, n-, sec- or tert-butyl, straight-chain or branched pentyl or hexyl or cyclohexyl, it being possible for these radicals to be substituted one or more times by, for example, OH, C$_1$-C$_4$alkoxy or C$_1$-C$_4$hydroxyalkoxy.

Examples of suitable substituted alkyl radicals are methoxymethyl, ethoxymethyl, ethoxyethyl, ethoxypropyl, n-propoxymethyl, butoxyethyl and 2-hydroxyethoxypentyl.

Unsubstituted or substituted phenyl R$_1$ or R$_2$ may be substituted one or more times, for example by C$_1$-C$_4$alkyl, C$_1$-C$_4$alkoxy, halogen, such as fluoro, chloro or bromo, or nitro.

R$_1$ and R$_2$ are preferably hydrogen or C$_1$-C$_4$alkyl.

Y$_1$ and Y$_2$ are preferably =O or =NH, it being additionally preferred for Y$_1$ and Y$_2$ to be identical.

Y$_3$ is preferably =O, =S, =NH or =N—CN and in particular is =NH.

The dyes of the formula (1) are known or may be prepared conventionally.

The stilbene dyes comprise complex dye mixtures resulting from the condensation of 4-nitrotoluene-2-sulfonic acid with itself or with other aromatic compounds. Their structure is defined by the manner of their preparation. Examples of suitable stilbene dyes are those described in the Colour Index, Third Edition, Volume 4 (The Society of Dyers and Colourists, 1971) under the constitution numbers 40,000 to 40,510.

Suitable dyes in the process of the invention include preferably the dyes Direct Yellow 11 and its derivatives Direct Yellow 6 and Direct Orange 15, obtainable by reductive steps incorporated additionally into the synthesis.

Suitable optical brighteners for the process of the invention include brighteners of various classes which contain sulfo groups and/or carboxyl groups, examples being bistriazinylaminostilbenes, bistriazolylstilbenes, bisstyrylbiphenyls or bisbenzofuranylbiphenyls, bisbenzoxalyl derivatives, bisbenzimidazolyl derivatives, coumarin derivatives or pyrazoline derivatives.

For example, the process of the invention is suitable for preparing concentrated solutions of the following optical brighteners:

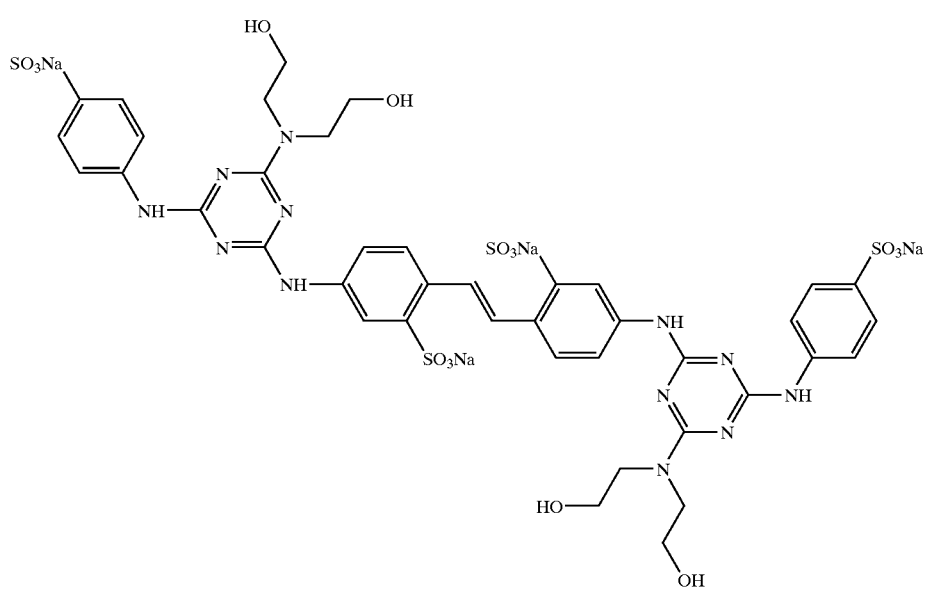
(3)

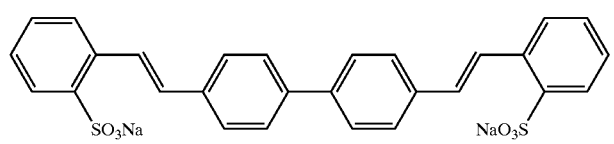
(4)

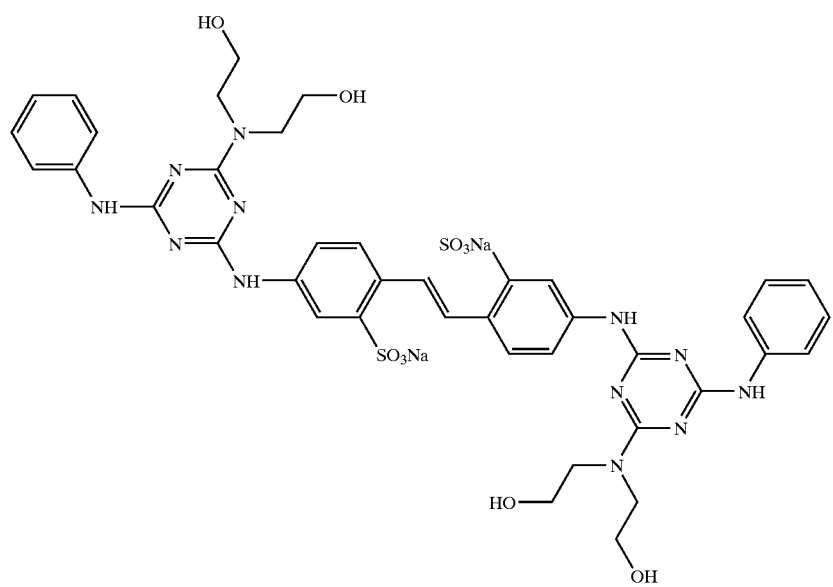
(5)
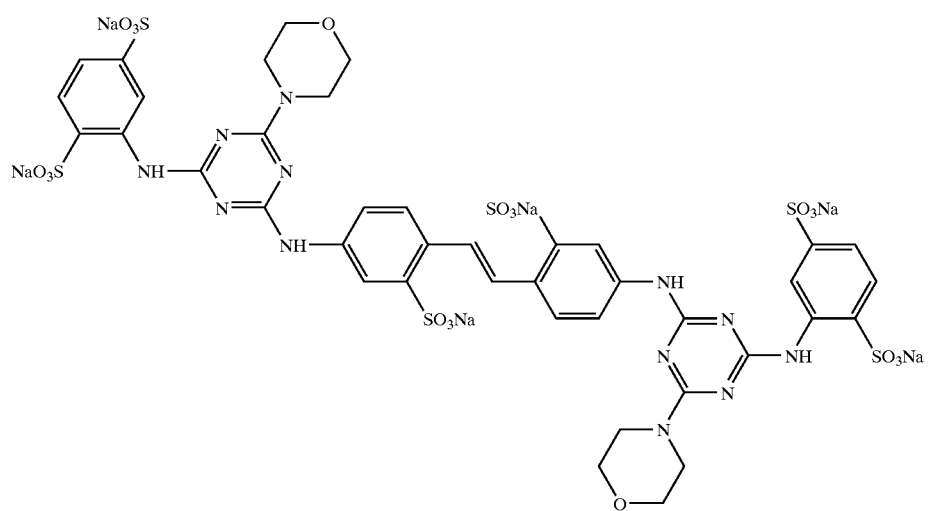
(6)
or
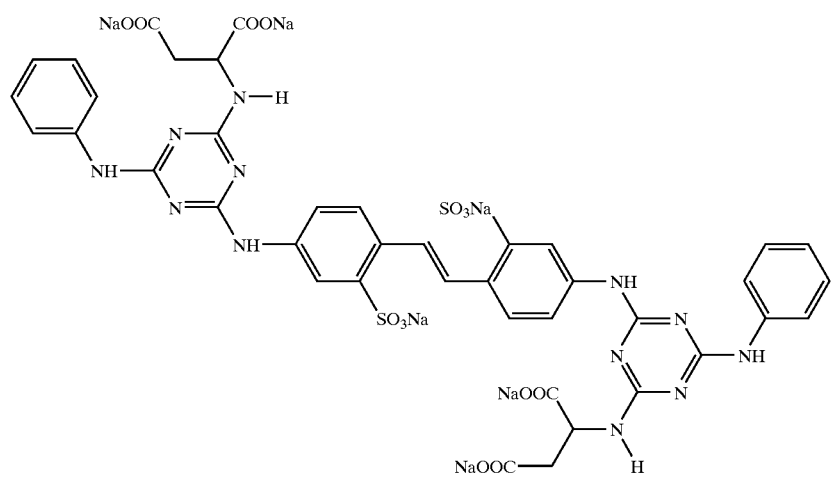
(7)

Suitable intermediates for the process of the invention include, in particular, anionic intermediates used for synthesizing dyes or optical brighteners.

Such intermediates include in particular aromatic sulfonic acids which additionally carry one or more further substituents, examples being amino, nitro, alkyl or hydroxyl.

Particularly suitable intermediates are, for example, the following: 2-amino-5-hydroxynaphthalene-7-sulfonic acid, 4-aminotoluene-2-sulfonic acid, dehydroparathiotoluidinesulfonic acid, 4,4'-diaminostilbene-2,2'-disulfonic acid, 4,4'-dinitrostilbene-2,2'-disulfonic acid, 4,4'-diaminodiphenylamine-2-sulfonic acid and 4-nitrotoluene-2-sulfonic acid.

The process of the invention is carried out in detail as follows:

The normal starting point is an aqueous synthesis solution or synthesis suspension which as well as the anionic organic compound contains greater or lesser amounts of starting materials, byproducts, salts or other impurities. Where, in contrast, the anionic organic compound is in solid form or in the form of a slurry or paste, it is first suspended in water to give an aqueous suspension or solution.

If the anionic organic compound is already in the form of the free acid therein, then the ultrafiltration is carried out immediately. If, on the other hand, it is in salt form, then the first stage of the process of the invention comprises converting the salt into the free acid.

In the case of compounds having two or more sulfo groups, it is sometimes advantageous to perform the conversion into the free acid in two or more stages at different pH values and/or temperatures, or to convert only some of the sulfo groups into the free acid.

To prepare the free acid, an aqueous solution or suspension of the anionic organic compound containing salts and/or other impurities is acidified to a pH of 4.5 or below and is stirred or mixed until the anionic organic compound has undergone almost complete conversion into the free acid and is therefore water-insoluble, and precipitates. This takes place preferably by the addition of a strong inorganic acid, for example hydrochloric acid or sulfuric acid, until the desired pH has been reached. The conversion takes place advantageously at a temperature between 15 and 140° C., in particular between 20 and 95° C.

The optimum pH, the temperature, the concentration and the duration of mixing must be adjusted for the anionic organic compound and for the desired degree of substitution. The optimum conditions are easy to determine by means of corresponding experiments.

In the case of anionic organic compounds which are difficult to convert, it may be useful first to subject the solution or suspension to partial desalination and only then to carry out the conversion into the free acid. This may be done, for example, by nanofiltration or intermediate isolation of the anionic organic compound. Furthermore, it is possible to use special synthesis techniques to generate low-salt synthesis solutions, such as simultaneous diazotization and coupling, for example. Furthermore, an anionic organic compound which has been only partly converted into the free acid can be washed until low in salt and then further acid can be added and can be stirred in or mixed in, at an elevated temperature if desired.

Washing and conversion into the free acid may also be carried out continuously in succession by circulating the suspension through an ultrafiltration module which is connected in series with a reactor for conversion into the free acid and, if desired, for heating.

Ultrafiltration takes place by means of the methods which are customary per se and which are common knowledge, using the known membranes. These membranes may comprise acid-resistant organic or inorganic material. Particularly suitable membranes are ceramic membranes, for ultrafiltration particularly those having a pore size of from 0.005 to 0.01 $\mu$m.

The temperature during the ultrafiltration is approximately between room temperature and about 95° C., preferably between 50 and 85° C. The pressure depends, inter alia, on the nature of the membrane, but is usually between 2 and 10 bar, preferably between 4 and 8 bar.

Washing and concentration by means of ultrafiltration is carried out until the desired salt content and the desired concentration of anionic organic compound have been achieved. Normally, the aim is for an inorganic salt content of below 2% by weight, preferably below 0.5% by weight, based on the total weight of the suspension.

Following ultrafiltration, the amount of anionic organic compound is preferably between 5 and 50% by weight, in particular between 10 and 40% by weight, based on the total weight of the suspension.

Following ultrafiltration, the low-salt or salt-free suspension may be admixed with any desired bases in order to give readily soluble salts of the anionic organic compounds with any desired cations. Examples of suitable bases are LiOH, $NH_4OH$, or organic amines, such as a $C_4$–$C_{12}$trialkylamine, $C_4$–$C_{12}$diamine, $C_2$–$C_{15}$alkanolamine or polyglycolamine, for example. It is preferred to use LiOH, $NH_4OH$ or an alkanolamine.

The resultant dye solutions or brightener solutions may be used directly in this form or, if desired, after dilution. Alternatively, they can be dried in a customary manner and used as powders or granules.

In the examples below the parts and percentages are by weight unless stated otherwise. The temperatures indicated are in degrees Celsius.

EXAMPLE 1

96 parts of dehydrothio-p-toluidinesulfonic acid are suspended in 600 parts of water at 60° and are dissolved at a pH of from 7.5 to 8 by adding 25 parts of 50% sodium hydroxide solution. Following complete dissolution, 46.3 parts of sodium nitrite solution (46 parts in 100 parts of water) are added. The resulting solution is metered over the course of 20 minutes into 90 parts of 32% hydrochloric acid and a little ice, the temperature being maintained between 15 and 20° by continual addition of ice. Stirring is continued for 30 minutes, to give about 1400 parts of a yellow suspension. Prior to coupling, any excess sodium nitrite is removed using sulfamic acid.

40.5 parts of barbituric acid are added to the resulting suspension, and the mixture is stirred for 15 minutes. Then about 46 parts of 50% sodium hydroxide solution are metered in over the course of 3 hours so as to maintain a pH of 3.3. When sodium hydroxide solution is no longer taken up, the mixture is heated to 75° and, at this temperature, 69 parts of 32% hydrochloric acid are added over 5 minutes, after which the mixture is stirred at 80 to 85° for 2 hours. During this time, the orange-coloured suspension, containing the sodium salt of the dye, is converted into the yellow suspension of the free acid of the formula

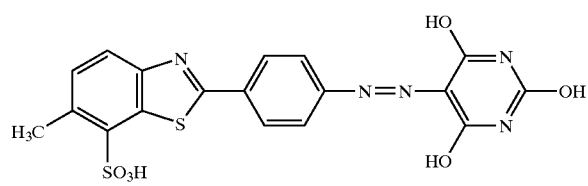

(8)

The volume is approximately 1800 parts.

The suspension is cooled down to 50 to 60° and the volume is reduced by a third by ultrafiltration in a customary ultrafiltration unit fitted with membrane candles (ceramic membrane on $Al_2O_3$ support material, pore size 0.005 to 0.02 μm).

Then washing is carried out in the same unit first with 3600 parts of deionized water adjusted to a pH of 1.0 with HCl and then with 2400 parts of deionized water adjusted to a pH of 4.5 with HCl. Thereafter, the mixture is concentrated to 900 parts by volume.

A solution of 6.5 parts of lithium hydroxide $1H_2O$ and 34 parts of triethanolamine in 80 parts of water is added to the resulting suspension. This gives a dark, clear solution having a pH of about 7. Addition of 80 parts of water gives 1100 parts of a storage-stable dye formulation having a sodium content of less than 300 ppm and a dye content of 11.6% (calculated as free acid).

If the procedure is carried out without ultrafiltration and the dye is isolated from the suspension in the free acid by filtration and washing of the presscake with water, then in the course of normal operating practice using conventional filter presses it is impossible to obtain the desired low sodium content.

EXAMPLE 2

The procedure described in example 1 is repeated but using, instead of barbituric acid, an equivalent amount of cyaniminobarbituric acid and conducting the conversion into the free acid at 85° using 10% HCl. Concentration is then carried out by a factor of 2 in the same ultrafiltration unit. This is followed by washing with 4 times the volume of deionized water which has been adjusted to a pH of 3.0 using HCl.

Following further operation as in example 1, with just triethanolamine as base, a storage-stable formulation of the dye of the formula

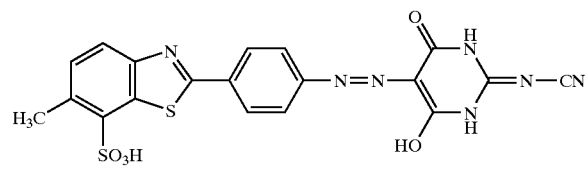

(9)

is obtained which has a chloride content of less than 0.1% and a sodium content of less than 0.05%.

EXAMPLE 3

The procedure described in example 1 is repeated but using, instead of barbituric acid, an equivalent amount of 2,4,6-triaminopyrimidine and carrying out the conversion into the free acid at 60° and a pH of from 1 to 2. Concentration is then carried out in the same ultrafiltration unit by a factor of 2. This is followed by washing with 5 times the volume of deionized water which has been adjusted to a pH of 1.0 using HCl.

Following further operation as in example 1, a storage-stable formulation of the dye of the formula

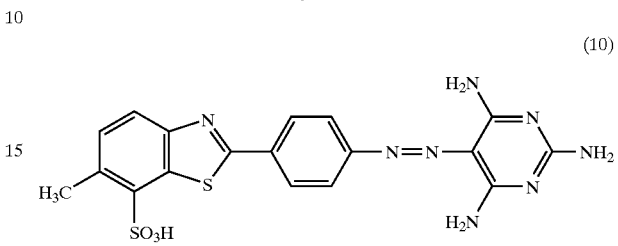

(10)

is obtained, using as the base mixture an equivalent amount of a 1:1 mixture of 3-diethylamino-1-propylamine and diethanolamine.

EXAMPLE 4

800 parts of water were charged to a flask with plane-ground joints, and 120 parts of NaOH in solid form are introduced at a rate such that the temperature does not exceed 60°. 217 parts of 4-nitrotoluene-2-sulfonic acid are then introduced over the course of 5 minutes into the warm sodium hydroxide solution. The temperature is subsequently raised to 74° over the course of 1 hour and 100 parts of water are added dropwise over the course of a further hour. The pH of the reaction mixture is more than 12. It is stirred at from 70 to 75° for a further 4 hours and then 650 parts of water are added and, over the course of 25 minutes, concentrated sulfuric acid is added in an amount such that all of the dye precipitates. Thereafter, the reaction mixture is stirred with heating for a further 30 minutes.

As described in example 1, ultrafiltration and acidic washing with dilute sulfuric acid gives a low-salt dye form which, following concentration and neutralization with diethanolamine, gives a stable liquid formulation of the dye Direct Yellow 11.

EXAMPLES 5–49

The following table contains further dyes of which storage-stable concentrated solutions can be prepared by ultrafiltration in accordance with the procedure of examples 1–3. The names of the dyes refer to the Colour Index, Third Edition, Volume 2 (The Society of Dyers and Colourists, 1971).

| Example | Dye |
|---------|-----|
| 5 | Direct Yellow 27 |
| 6 | Direct Yellow 127 |
| 7 | Direct Yellow 132 |
| 8 | Direct Yellow 137 |
| 9 | Direct Orange 15 |
| 10 | Direct Yellow 142 |
| 11 | Direct Yellow 4 |

-continued

| Example | Dye |
| --- | --- |
| 12 | Direct Yellow 148:1 |
| 13 | Direct Yellow 153 |
| 14 | Direct Yellow 157 |
| 15 | Direct Yellow 6 |
| 16 | Direct Yellow 169 |
| 17 | Direct Orange 26 |
| 18 | Direct Red 16 |
| 19 | Direct Red 23 |
| 20 | Direct Red 31 |
| 21 | Direct Red 238 |
| 22 | Direct Red 252 |
| 23 | Direct Red 253 |
| 24 | Direct Red 254 |
| 25 | Direct Red 262 |
| 26 | Direct Violet 9 |
| 27 | Direct Violet 51 |
| 28 | Direct Violet 66 |
| 29 | Direct Violet 99 |
| 30 | Direct Yellow 51 |
| 31 | Direct Yellow 86 |
| 32 | Direct Yellow 154 |
| 33 | Direct Orange 118:1 |
| 34 | Direct Red 80 |
| 35 | Direct Red 239 |
| 36 | Direct Violet 35 |
| 37 | Direct Blue 67 |
| 38 | Direct Blue 75 |
| 39 | Direct Blue 78 |
| 40 | Direct Blue 80 |
| 41 | Direct Blue 218 |
| 42 | Direct Blue 267 |
| 43 | Direct Blue 273 |
| 44 | Direct Blue 281 |
| 45 | Direct Blue 290 |
| 46 | Direct Blue 301 |
| 47 | Direct Blue 86 |
| 48 | Direct Blue 199 |
| 49 | Direct Black 22 |
| 50 | Direct Black 168 |
| 51 | Direct Blue 86 |

What is claimed is:

1. A process for preparing concentrated solutions or suspensions of anionic organic compounds, which comprises
   a) acidifying an aqueous solution or suspension of an anionic organic compound containing salts and/or impurities to a pH of 4.5 or less, if the pH is above this value, so that
   b) the anionic organic compound is water-insoluble and precipitates in the form of the free acid,
   c) bringing the suspension to a salt content below 2% by weight, based on the total weight of the retentate, by means of ultrafiltration with a membrane having pore diameters of from 0.001 to 0.02 μm, and
   d) optionally washing out the salts with water having a pH below 4.5,
   e) optionally carrying out acid-free washing with water thereafter, and then
   f) concentrating, so that the amount of anionic organic compound is 5–50% by weight, and
   g) if desired, bringing the anionic organic compound into solution by adding an appropriate base.

2. A process according to claim 1, wherein a dye, optical brightener or intermediate for the preparation thereof is used as anionic organic compound.

3. A process according to claim 2, wherein dyes containing at least one sulfonic acid and/or carboxylic acid group, from the following dye classes, are used: metal-free or metallic monoazo, disazo and polyazo dyes, pyrazolone, thioxanthone, oxazine, stilbene, formazan, anthraquinone, nitro, methine, triphenylmethane, xanthone, naphthazarine, styryl, azastyryl, naphthoperinone, quinophthalone, and phthalocyanine dyes.

4. A process according to claim 3, wherein azo dyes containing at least one sulfo group are used.

5. A process according to claim 4, wherein a dye of the formula

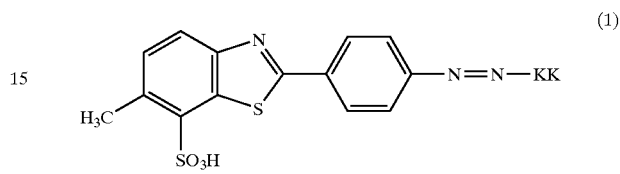

(1)

is used in which KK denotes the radical of a coupling component.

6. A process according to claim 5, wherein a dye of the formula (1) is used in which KK is a coupling component of the formula

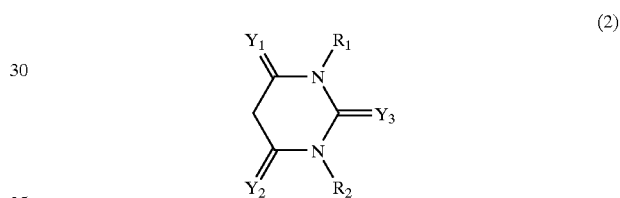

(2)

in which $Y_1$ and $Y_2$ independently of one another are =O, =NH, or =N—$C_1$–$C_4$alkyl, $Y_3$ is =O, =S, =NR or =N—CN, where R is hydrogen or $C_1$–$C_4$alkyl, and $R_1$ and $R_2$ independently of one another are each hydrogen, unsubstituted or substituted alkyl or unsubstituted or substituted phenyl.

7. A process according to claim 6, wherein a dye of the formula (1) is used in which KK is a coupling component of the formula (2) in which $R_1$ and $R_2$ are hydrogen or $C_1$–$C_4$alkyl, $Y_1$ and $Y_2$ are =O or =NH, and $Y_3$ is =O, =S, =NH or =N—CN.

8. A process according to claim 1, wherein the dye Direct Yellow 11, Direct Yellow 6 or Direct Orange 15 is used.

9. A process according to claim 2, wherein an optical brightener containing sulfo and/or carboxyl groups and from one of the following classes is used: bistriazinylaminostilbenes, bristriazolylstilbenes, bisstyrylbiphenyls or bisbenzofuranylbiphenyls, bisbenzoxalyl derivatives, bisbenzimidazolyl derivatives, coumarin derivatives or pyrazoline derivatives.

10. A process according to claim 9, wherein the optical brightener used is

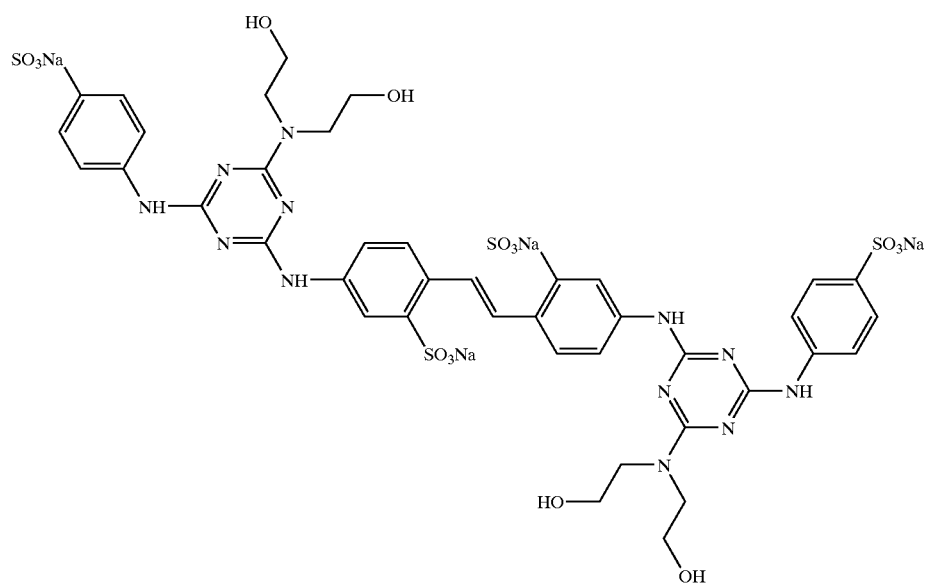
(3)
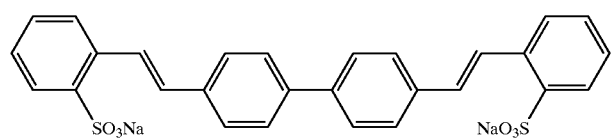
(4)
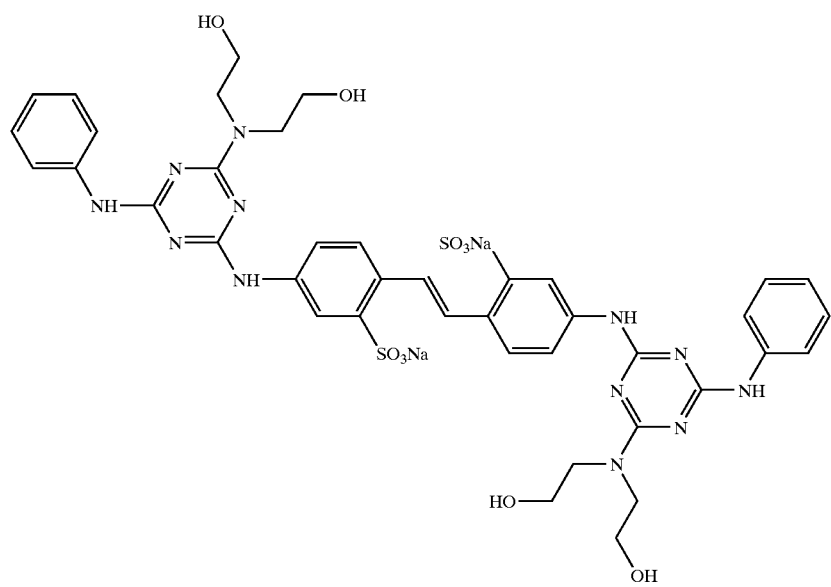
(5)

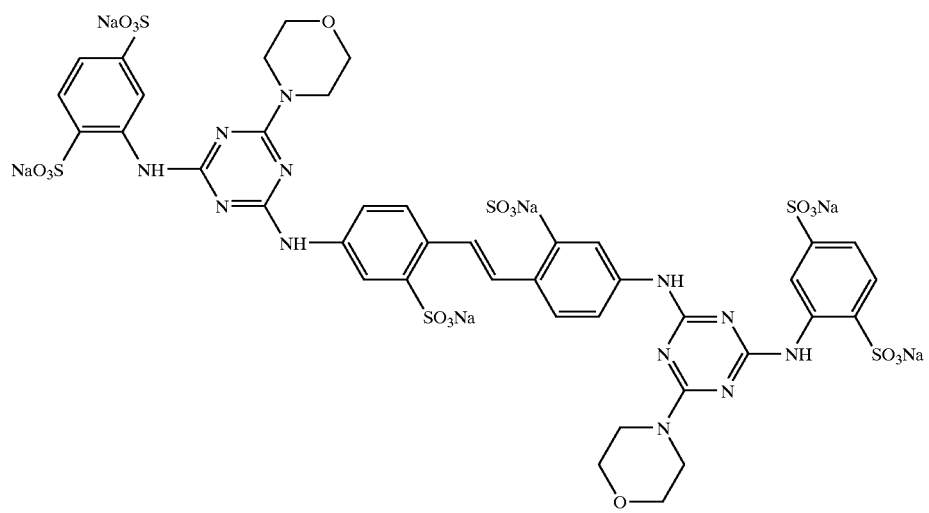

(6)

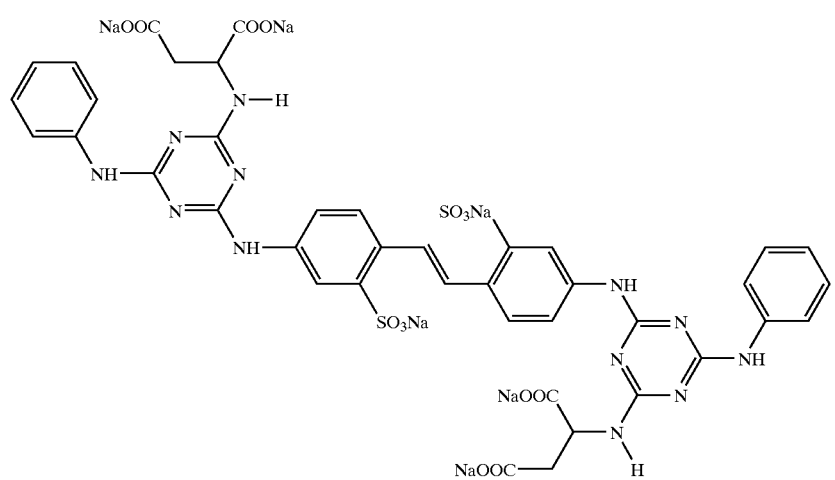

or (7)

11. A process according to claim 2, wherein an aromatic sulfonic acid which also carries one or more further substituents from the group consisting of amino, nitro, alkyl and hydroxyl is used as anionic intermediate.

12. A process according to claim 11, wherein 2-amino-5-hydroxynaphthalene-7-sulfonic acid, 4-aminotoluene-2-sulfonic acid, dehydroparathiotoluidineulfonic acid, 4,4'-diaminostilbene-2,2'-disulfonic acid, 4,4'-dinitrostilbene-2,2'-disulfonic acid, 4,4'-diaminodiphenylamine-2-sulfonic acid or 4- nitrotoluene-2-sulfonic acid is used.

13. A process according to claim 1, which starts from an aqueous synthesis solution or synthesis suspension containing, in addition to the anionic organic compound, greater or lesser amounts of starting materials, byproducts, salts or other impurities.

14. A process according to claim 13, wherein in the salts of the anionic organic compound in the synthesis solution or synthesis suspension first of all some or all sulfo and/or carboxyl groups are converted into the free acid.

15. A process according to claim 1, wherein the ultrafiltration is carried out between room temperature and about 95° C.

16. A process according to claim 1, wherein the ultrafiltration is carried out at a pressure of between 2 and 10 bar.

17. A process according to claim 1, wherein, following the ultrafiltration, the low-salt or salt-free suspension obtained is admixed with LiOH, $NH_4OH$, or an organic amine.

18. A process according to claim 17, wherein a $C_4$–$C_{12}$trialkylamine, $C_4$–$C_{12}$diamine, $C_2$–$C_{15}$alkanolamine or polyglycolamine is used as organic amine.

19. A solution of anionic organic compounds, obtained by a process according to claim 18.

20. A process for dyeing or optically brightening paper, which comprises contacting paper with an effective amount of a solution as described in claim 19 in which the anionic organic compounds comprise at least one anionic dye or optical brightener.

* * * * *